June 16, 1959     A. BULOVA ET AL     2,890,522
ELECTRIC SHAVERS WITH MEANS TENSIONING THE GRILL ARCUATELY
Filed Aug. 14, 1956
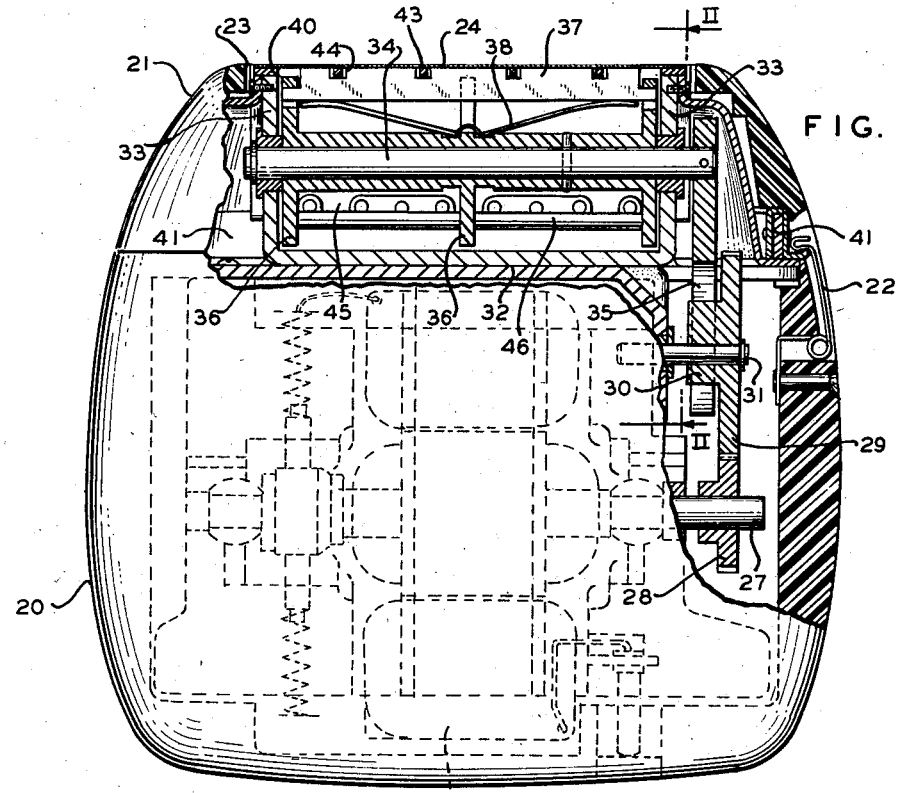
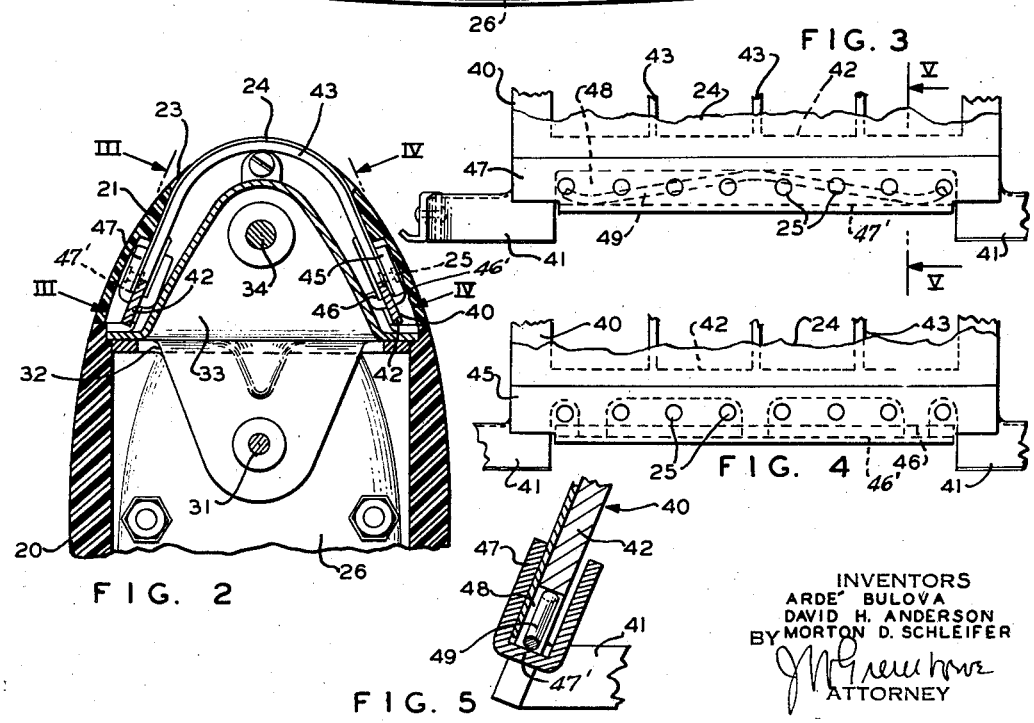
INVENTORS
ARDE' BULOVA
DAVID H. ANDERSON
MORTON D. SCHLEIFER
BY
ATTORNEY United States Patent Office 2,890,522
Patented June 16, 1959

2,890,522

ELECTRIC SHAVERS WITH MEANS TENSIONING THE GRILL ARCUATELY

Arde Bulova, New York, David H. Anderson, Flushing, and Morton D. Schleifer, West Hempstead, N.Y., assignors to Bulova Watch Company, Inc., Flushing, N.Y., a corporation of New York Application August 14, 1956, Serial No. 604,021

2 Claims. (Cl. 30—43)

This invention relates to electric shavers, and more particularly to the mounting of the grill or comb thereof.

It is common practice in the construction of electric shavers to employ a grill or comb with a perforate area that constitutes the portion of the shaver that is brought into contact with the user's face or other surface to be shaved, and moved around upon and pressed against that surface during the shaving operation. In order to obtain a close shave, it has been deemed desirable to make the grill of very thin material since the shearing takes place at the inside surface of the grill. However, the thinner the grill, the more flexible it becomes, and prior art shavers have of necessity been required to employ a grill of such thickness that it will be effectually deterred from flexing away from its normal shearing relation to the blade, as a result of which the grills of previously marketed shavers have been too thick to give the desired closeness of shave. On the other hand, those shavers which have attempted to use grills of very thin material inherently have so much flexibility of the grill that it does not maintain close contact of the blade and even very slight separation of the grill from the blade results in failure to shear and thus again desired closeness of shave is not attained.

Fundamentally the present invention recognizes the problem outlined above and solves it with novel construction effecting a more perfect and close shave.

Basically, the invention is directed to obtaining constant and perfect contact of the grill against the blades during the entire sweep of the blade or blades against the perforate area of the grill even though the grill may be of very thin and unavoidably very flexible material.

Likewise of general nature, it is an object of the invention to provide a construction enabling a grill of very thin material to be successfully employed.

A further object of the invention is to draw the grill taut upon its supporting frame.

More specifically, the invention proposes a constantly applied resilient tensioning of the grill in place on its frame.

A detail object of the invention is to conveniently provide for captive tensioning means for the grill.

Yet another object of the invention is to provide novel attachment of the grill frame in place.

An essential consideration of the invention is to avoid increase of normal size of the cap and to avoid bulkiness or protrusions beyond the general contour of the cap.

Other objects, advantages and beneficial constructional features will appear to persons skilled in the art to which the invention appertains as the description proceeds, both by direct recitation thereof and by implication from the context.

Referring to the accompanying drawing, in which like numerals of reference indicate similar parts throughout the several views:

Figure 1 is a view partially in front elevation and partially in section on a plane through the middle of the shaver;

Figure 2 is a sectional view on line II—II of Fig. 1;

Figure 3 is a view substantially on line III—III of Fig. 2, showing what is arbitrarily termed the front of a portion of the grill and its supporting frame;

Figure 4 is a view substantially on line IV—IV of Fig. 2, and showing a portion of the rear of the grill and frame; and Figure 5 is a sectional view on line V—V of Fig. 3.

It is common practice in electric shavers to employ a grill or comb having a shape of a partial cylinder, and in conjunction therewith to provide a blade or blades having a sweep against the inside surface of the grill. The present invention is equally applicable to fully revolving blade type of shaver, to spiral drum type, and to the type wherein the blade oscillates back and forth in the direction of curvature of the grill. For simplicity of showing, this last-mentioned oscillatory type of shaver is arbitrarily selected for illustrative purposes herein.

In the specific embodiment of the invention illustrated in said drawings, the electric shaver comprises a body casing 20 of appropriate size and shape for a user to conveniently hold in one hand while operating. At what will arbitrarily be termed the top or nose end of said casing is a cap 21 fitting thereon and held in place by resilient latches 22.

For convenience of description and for orienting purposes, it may be pointed out that the shaver has been illustrated in an arbitrarily selected position and the use of terms such as front and back, up and down, right and left, relate only to particular positions of parts as viewed in the drawings and are not to be considered restrictive as to construction or positioning of the shaver or its constituent parts.

Resorting to the use of such terminology, the upper or forward nose end of said cap 21 provides an elongated opening 23 extending from proximity of one side edge to the other side edge of the cap, exposing for the entire opening area a grill or comb 24 which is, for most of its exposed portion substantially a segment of a cylinder in shape and has the usual perforate shearing area that constitutes the portion of the shaver which is brought into contact with the hairy surface where shaving is to be performed. Since shearing takes place at the inner surface of the grill, it is desirable to use very thin material for the grill; for example, it may be stainless steel of two or three thousandths or less in thickness. The metal used will have adequate resiliency to return to its original contour from any moderate flexing that may occur in use, such flexing being deterred and return to original contour being assisted by tensioning hereinafter described which maintains the grill in taut condition. At the side edges of opening 23 of the cap there is no underlapping, as here shown, of the side edges of the grill, those edges of the grill being very close to but not interfered with by the side edges of the opening. However, at the front and back of the grill, the margins thereof extend downwardly within the cap contiguous to the front and back walls thereof. Each of these bottom margins of the grill of the shaver shown in the drawing have bars 45, 47 longitudinally thereof, but as said bars are not identical, they will be individually described and identified later in this specification. Common to both of said bars is the fact that they are coextensive with the transverse length of the grill and are permanently secured to the grill margin as by rivets 25. It may also be mentioned that there is a metallic frame 40 within said cap, an essential feature of which is to support the grill and maintain the shape or contour thereof.

Within body casing 20 is an electric motor, designated in general by numeral 26, and protruding at one side of said motor is an armature shaft 27. On said protruding end of said armature shaft is secured a driving wheel 28, here shown as a gear wheel which is continuously rotated by said motor. Above the driving wheel is a driven wheel 29 likewise here shown as a gear wheel, and indicated as in mesh with gear teeth of the driving wheel. Fixed with respect to the driven wheel 29 is an eccentric 30, these being mounted on a stub shaft 31 projecting from the side of the motor.

On the top of said motor 26, for rigid support thereby, is a shaving head constituted as an assembly attachable to said motor and including, in the present showing, a horizontally disposed double laminated sheet metal base 32. The laminations of said base are unified as by spot welding them together. At the opposite ends of the upper lamination of said base, the metal is bent upwardly to provide upstanding brackets 33 parallel one to the other and in planes perpendicular to the armature shaft. These brackets provide bearing support for a blade shaft 34 that extends parallel to the armature shaft 27. Said blade shaft has one end protruding through its mounting bracket 33 to overlie said eccentric 30, and on said end is secured a swinging arm 35 which depends from said blade shaft, to which it is fixed, and straddles said eccentric in diametrically opposed riding contact therewith so that as the eccentric rotates, said arm will be swung back and forth with a definite amplitude or angular displacement predetermined by the chosen parameters of the eccentric and length of said arm. Since the arm 35 is fixed on the blade shaft 34, swinging of said arm under actuating influence of the eccentric will result in corresponding oscillation of said blade shaft about its axis.

Fixed with respect to said blade shaft 34 are a plurality of blade-carriers, which in the present showing are rockers, and disc-shaped, although not necessarily so, and designated by numeral 36. The particular blade-carriers illustrated are in planes perpendicular to the blade shaft 34 with peripheral segments thereof toward the grill coaxial with and close to the cylindrical portion thereof without contacting the grill, so as to be free to move or oscillate proximate thereto. The blade-carriers 36 are for the purpose of mounting elongated blades 37, suitably spring loaded as by captive springs 38, for engagement of long edges of the blades with the inside surface of the cylindrical portion of the grill and to effect a sweep of said blades in a direction circumferentially of said grill. The said grill 24 provides a shaving area at its cylindrical portion with perforations therein to admit the hair to be shaved, and shearing is effected by the sweep of the blades in juxtaposition to said shaving area. By utilization of a plurality of blades, the sweep of each only has to traverse a part of the area and thus the sweep of each may be less than would be required to make a single blade traverse the entire area.

Mention has been made hereinabove of a frame 40 the feature of which is primarily to support and maintain the contour or shape of the grill. Said frame is preferably constructed as a unitary stamping from sheet material, such as brass, aluminum, alloy or other suitable metal, with horizontal loops or feet 41 at each end. Corresponding ends of the oppositely located loops or feet 41 are integrally joined by body rails 42 which extend in a direction from side to side of the shaver and in appropriate planes so as to be located flatwise with respect to the front and rear lower margins respectively of the grill. Integral with and extending from one body rail 42 to the other, are a plurality of upstanding arched ribs 43, of which the two end ones are shown wider than the intermediate ones and have support substantially throughout their lengths by having direct contact with the edge of a respective one of aforesaid brackets 33. The upper or forward portions of said brackets as well as the upper or forward portions of all of said ribs are coaxial with the blade shaft 34. Grill 24 lies against the outer upwardly directed surfaces of the ribs, and therefore will have its nose end segmentally cylindrical and coaxial to the blade shaft.

There are preferably several blades 37 in spring-loaded contact with the inside surface of the grill, which not only reduces the required sweep of each blade, but keeps a supporting pressure of blades at all times against the inside surface of the grill. The shearing edges of said blades are appropriately notched at 44 to clear the several ribs of the frame.

Cap 21 and cap frame 40 are frictionally or otherwise held together, for which purpose the construction may be such that when the cap is removed from casing 20 the frame 40 is simultaneously removed, or it may be such that the cap may be removed without removal of the grill and grill frame which will then be left on the top of the casing in exposed condition for cleaning.

An important feature of the present invention resides in the mode and manner of attachment of the grill to said frame. Reminder may be here inserted that arbitrarily Fig. 1 has been termed a front elevation, so that in taking section of Fig. 2, the front is toward the left and the rear is toward the right. It has heretofore been mentioned that the front and rear margins of the grill have bars riveted thereon. The rear bar, now identified by numeral 45, Figs. 1, 2 and 4, is J-shape in cross-section with the deep leaf thereof at the outer face of the grill margin so that said grill is riveted in contacting juxtaposition to said deep leaf. The inner or shallow leaf of said J-shaped rear bar 45 is spaced inwardly away from the grill, and constitutes a hook 46 along most of the length of said bar and includes a basal connection or ledge 46' that engages under the body rail 42 at the rear of the shaver from one foot 41 at one end of said rail to the other foot 41 at the other end of said rail. Both the bar 45 with its hook 46 and ledge 46' in engagement with frame rail 42 provide transverse rigidity to the grill thereat.

At the front margin of the grill is a front bar 47, Figs. 2, 3 and 5, which in this instance is a full U-shape in cross-section so that both leaves of said bar are of equal depth. The margin of the grill at the front thereof is riveted at the inside face of the front leaf of the bar, and adequate space is provided between the rear face of the grill thereat and the inner face of the other leaf of the bar to accommodate the thickness of the front rail 42 of the frame therein. The basal connection or ledge 47' between the two leaves at the bottom of the U-shape thereof, extends longitudinally of and beneath the rail from one foot 41 at one end of the rail to the other foot 41 at the other end of the rail. Throughout that length from foot to foot, this rail is longitudinally cut away at its bottom margin, thereby having a bridge formation, and such that the basal connection or ledge 47' of the U-shaped bar 47 can ride up into the cut-away portion while the leaves ride proximate to opposite faces of the rail and in conjunction with the cut-away portion of the rail form a substantially closed pocket 48. In said pocket is held captive a wire bow spring 49 end portions of which are shown resting against the bottom of the pocket constituted by the basal connection or ledge 47' of the bar leaves, and its bowed middle pressing against the top of said pocket constituted by the lower edge of the rail 42 at the cut out portion thereof. Said spring is quite strong, and exerts, for instance, five or ten pounds pull on the grill, keeping the grill taut during use of the shaver and thereby maintaining the segmentally cylindrical character of the nose portion of the grill by pulling it and holding it tightly on the supporting ribs 43 which have that precise shape. Since the bar 47 is riveted to the grill and is rigid, the grill cannot sag between ribs while being drawn taut by said bar under influence of captive spring 49. Thus shearing contact of the blades moving in a rotary direction upon an axis is assured by maintaining the cylindrical configuration of said grill throughout its shearing area.

In conclusion, it is pointed out that it is contemplated that the blades are spring-loaded and therefore exert an outward pressure on the grill which obviously tends to lift the grill from the supporting arched ribs. If such lifting were permitted, the lifted area would no longer be of the same cylindrical contour as the arches or the same radius as the said arches. The invention proposes a very thin grill which would be very susceptible to the undesired lifting and deformation but further provides for a counter-tension spring to hold the grill taut and counteract the force applied by the blade springs.

What is claimed is:

1. An electric shaver having a pliable grill at one end thereof, said grill extending longitudinally from side to side of the shaver, a blade having sweeping engagement with said grill, means for driving said blade, a frame for mounting and supporting said grill, said frame having basal rails extending longitudinally from side to side of the shaver at the front and back thereof and having arched members from one rail to the other for supporting the grill arcuately at the face thereof toward the blade, said grill being flexible and adapted to be brought into arcuate engagement with said arched members and with longitudinal bottom edge portions of the grill proximate to and longitudinal of said basal rails, stiffening bars secured to both of said longitudinal edge portions of the grill at the front and back of the frame and parallel to said rails and each bar having a ledge portion directed inwardly of the frame arch toward the ledge portion of the other bar, said ledges underlying said rails, at least one of said bars having a loose relation to its rail so as to enable the ledge of that bar to move freely toward and away from said rail, and a spring longitudinally disposed between the ledge of said one bar and its rail for maintaining that ledge and rail out of contact and said ledge of the one bar thereby movable in its entirety toward and away from its said rail and with the entire force of the spring functioning to tension the grill from one bar to the other arcuately on said frame.

2. An electric shaver having a pliable grill at one end thereof, said grill extending longitudinally from side to side of the shaver, a blade having sweeping engagement with said grill, means for driving said blade, a frame for mounting and supporting said grill, said frame having basal rails extending longitudinally from side to side of the shaver at the front and back thereof and having arched members from one rail to the other for supporting the grill arcuately at the face thereof toward the blade, said grill being flexible and adapted to be brought into arcuate engagement with said arched members and with longitudinal bottom edge portions of the grill proximate to and longitudinal of said basal rails, stiffening bars secured to both of said longitudinal edge portions of the grill at the front and back of the frame and parallel to said rails and each bar having a ledge portion directed inwardly of the frame arch toward the ledge portion of the other bar, asid ledges underlying said rails, one of said bars having a loose relation to its rail so as to enable the ledge of that bar to move freely toward and away from its said rail, and a spring longitudinally disposed between the ledge of said one bar and its rail for maintaining that ledge and rail out of contact and said ledge of the one bar thereby movable in its entirety toward and away from its said rail and with the entire force of the spring functioning to tension the grill from one bar to the other arcuately on said frame, said other bar having hooked positive unyielding engagement with its rail.

References Cited in the file of this patent

UNITED STATES PATENTS

| | | |
|---|---|---|
| 2,143,896 | Nyhagen | Jan. 17, 1939 |
| 2,174,039 | Muros | Sept. 26, 1939 |
| 2,182,067 | Bruecker | Dec. 5, 1939 |
| 2,234,893 | Bruecker | Mar. 11, 1941 |
| 2,234,929 | Lynch | Mar. 11, 1941 |
| 2,246,586 | Hanley | June 24, 1941 |
| 2,253,737 | Testi | Aug. 26, 1941 |
| 2,263,155 | Wright | Nov. 18, 1941 |
| 2,264,398 | Murphy | Dec. 2, 1941 |
| 2,287,686 | Jones | June 23, 1942 |
| 2,289,518 | Raia | July 14, 1942 |
| 2,304,909 | Hanley | Dec. 15, 1942 |
| 2,334,994 | Dalkowitz | Nov. 23, 1943 |
| 2,370,542 | Jepson | Feb. 27, 1945 |